United States Patent
Nemetz et al.

(10) Patent No.: US 10,950,041 B2
(45) Date of Patent: Mar. 16, 2021

(54) METHOD FOR GENERATING 3D DATA RELATING TO AN OBJECT

(71) Applicant: Ocean Maps GmbH, Salzburg (AT)

(72) Inventors: Thomas Nemetz, Salzburg (AT); Kreshnik Halili, Maishofen (AT)

(73) Assignee: OCEAN MAPS GMBH, Salzburg (AT)

( * ) Notice: Subject to any disclaimer, the term of this patent is extended or adjusted under 35 U.S.C. 154(b) by 113 days.

(21) Appl. No.: 16/311,553

(22) PCT Filed: Jun. 20, 2017

(86) PCT No.: PCT/EP2017/065119
§ 371 (c)(1),
(2) Date: Jun. 24, 2019

(87) PCT Pub. No.: WO2017/220599
PCT Pub. Date: Dec. 28, 2017

(65) Prior Publication Data
US 2019/0318536 A1    Oct. 17, 2019

(30) Foreign Application Priority Data

Jun. 20, 2016    (DE) ...................... 10 2016 111 239.9

(51) Int. Cl.
| | | |
|---|---|---|
| *G06T 17/00* | (2006.01) | |
| *G06T 17/05* | (2011.01) | |
| *G01C 13/00* | (2006.01) | |
| *G01S 15/89* | (2006.01) | |
| *G06T 11/00* | (2006.01) | |
| *G06T 15/04* | (2011.01) | |

(52) U.S. Cl.
CPC ............ *G06T 17/05* (2013.01); *G01C 13/008* (2013.01); *G01S 15/89* (2013.01); *G06T 11/001* (2013.01); *G06T 15/04* (2013.01); *G06T 2200/08* (2013.01)

(58) Field of Classification Search
CPC ....... G06T 11/001; G06T 15/04; G06T 17/05; G06T 2200/08; G01C 13/00
(Continued)

(56) References Cited

U.S. PATENT DOCUMENTS

| | | |
|---|---|---|
| 5,432,712 A | 7/1995 | Chan |
| 6,590,640 B1 | 7/2003 | Aiken et al. |

(Continued)

FOREIGN PATENT DOCUMENTS

| | | |
|---|---|---|
| DE | 10 2012 103 373 | 10/2013 |
| DE | 102016106214 | 10/2017 |

(Continued)

OTHER PUBLICATIONS

Hoppe, H., "Surface Reconstruction from Unorganized Points," University of Washington, 1-66 (1994).

(Continued)

*Primary Examiner* — Thomas J Lett

(74) *Attorney, Agent, or Firm* — HoustonHogle LLP

(57) ABSTRACT

The invention relates to a method of generating 3D data of an object, in particular for the generation of underwater maps. This method comprises the following steps:
provision of two-dimensional image data of the surface of the object, such as e.g. the bottom of a body of water, together with reference information
provision of a three-dimensional relief map of a predetermined area of the object or of the bottom of a body of water, and
mapping of the two-dimensional image data as texture on the three-dimensional relief map by means of the reference information.

12 Claims, 8 Drawing Sheets

Figure 1:
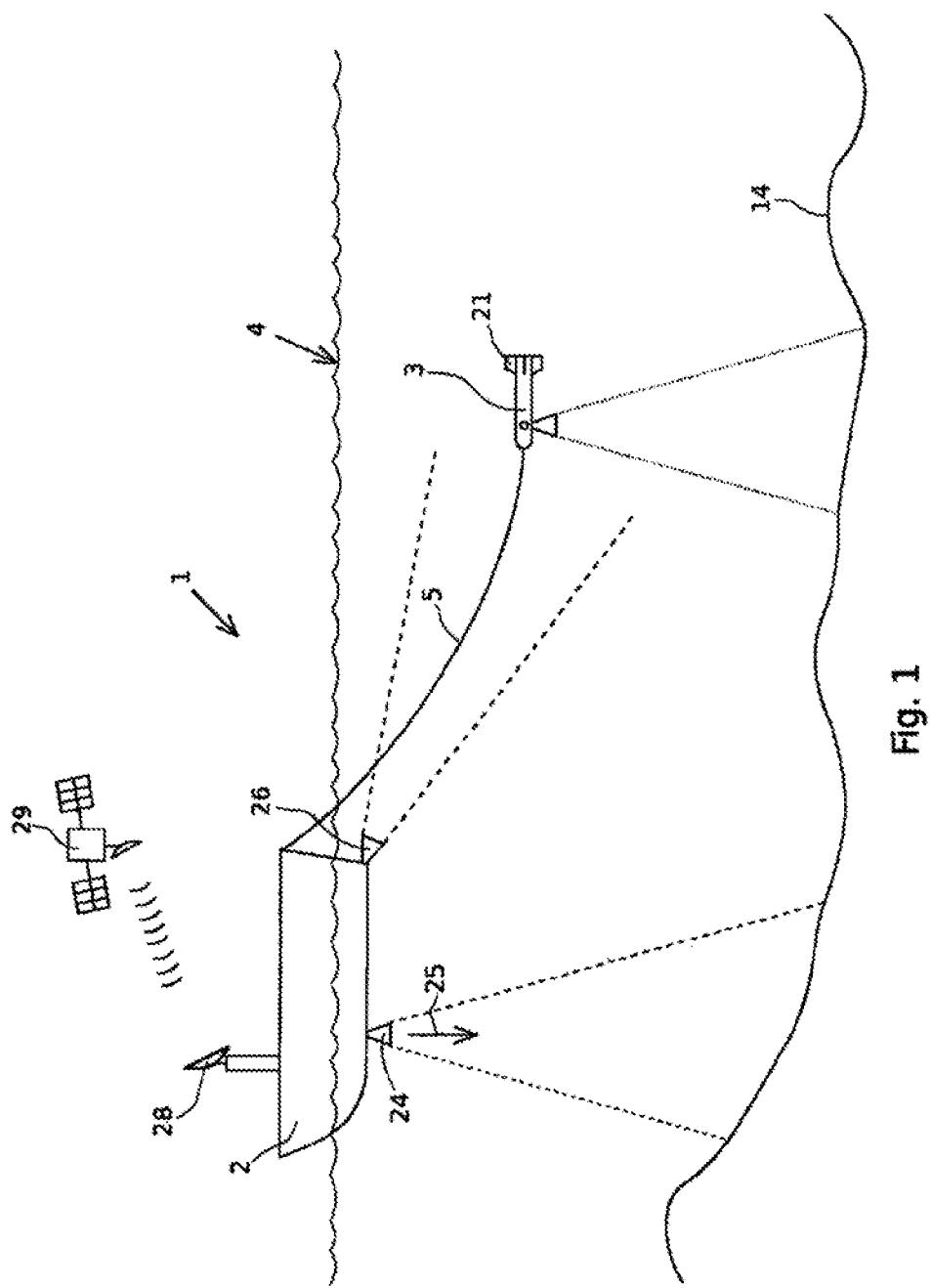

(58) Field of Classification Search
USPC .......................................................... 345/419
See application file for complete search history.

(56) References Cited

U.S. PATENT DOCUMENTS

| | | | |
|---|---|---|---|
| 8,654,189 B1* | 2/2014 | Spangler | H04N 7/183 348/81 |
| 2005/0213808 A1* | 9/2005 | Ohtomo | G01C 11/04 382/154 |
| 2006/0008137 A1* | 1/2006 | Nagahdaripour | G06K 9/0063 382/154 |
| 2006/0182314 A1 | 8/2006 | England et al. | |
| 2008/0257140 A1* | 10/2008 | Blohm | B63G 7/00 89/1.13 |
| 2014/0098215 A1* | 4/2014 | Dinis | B63C 11/26 348/81 |
| 2015/0002621 A1* | 1/2015 | Ratner | H04N 5/23238 348/36 |
| 2015/0078123 A1* | 3/2015 | Batcheller | G01S 15/86 367/7 |
| 2015/0301180 A1 | 10/2015 | Stettner et al. | |

FOREIGN PATENT DOCUMENTS

| | | |
|---|---|---|
| EP | 1 584 895 | 12/2005 |
| JP | 2007 309824 | 11/2007 |
| WO | WO 2012129612 | 10/2012 |

OTHER PUBLICATIONS

Lee, D.T., et al., "Two Algorithms for Constructing a Delaunay Triangulation," International Journal of Computer and Information Sciences, 9(3): 219-242 (1980).

Lorensen, W.E., et al., "Marching Cubes: A High Resolution 3D Surface Construction Algorithm," Computer Graphics, 21: 163-169 (1987).

Schenk, T., "Introduction to Photogrammetry," Department of Civil and Environmental Engineering and Geodetic Science, 1-100 (2005).

International Preliminary Report on Patentability, dated Dec. 25, 2018, from International Application No. PCT/EP2017/065119, filed on Jun. 20, 2017. 9 pages.

International Search Report of the International Searching Authority, dated Dec. 21, 2017, from International Application No. PCT/EP2017/065119, filed on Jun. 20, 2017. 7 pages.

Kunz, C., et al., "Map Building Fusing Acoustic and Visual Information Using Autonomous Underwater Vehicles," Journal of Field Robotics, 30(5): 763-783 (2013).

Massot-Campos, M., et al., "Optical Sensors and Methods for Underwater 3D Reconstruction," Sensors, 15: 31525-31557 (2015).

Pelagotti, A., et al., "Automated Multispectral Texture Mapping of 3D Models," 17th European Signal Processing Conference, Glasgow, Seiten, 1215-1219 (2009).

Sedlazeck, A., et al., "3D Reconstruction Based on Underwater Video from ROV Kiel 6000 Considering Underwater Imaging Conditions," IEEE, 1-10 (2009).

Written Opinion dated Dec. 21, 2017, from International Application No. PCT/EP2017/065119, filed on Jun. 20, 2017. 8 pages.

* cited by examiner

METHOD FOR GENERATING 3D DATA RELATING TO AN OBJECT

RELATED APPLICATIONS

This application is a § 371 National Phase Application of International Application No. PCT/EP2017/065119, filed on Jun. 20, 2017, now International Publication No. WO 2017/220599, published on Dec. 28, 2017, which International Application claims priority to German Application 10 2016 111 239.9, filed on Jun. 20, 2016, both of which are incorporated herein by reference in their entirety.

The present invention relates to a scanner for scanning the bottom of bodies of water for the automatic generation of underwater maps, and a method for the generation of underwater maps. For most bodies of water there exist no underwater maps which permit the planning of diving operations. Such maps should have a resolution of at least one metre and preferably greater resolutions. These maps are also of use for water management.

Such underwater maps, produced by Sea Floor Mapping Lab (SFML), are available for small areas around California.

For other areas there is certainly a large number of maps but, on account of their low resolution, they are of use neither for the planning of diving operations nor for water management.

The reason why underwater maps with the desired resolution are available only to a very limited extent is that the production of such underwater maps is very expensive. Data from different data sources must be combined. The data must include a height profile which correctly describes the bottom of the body of water with the necessary resolution. Texture information, which may be combined with the height profile, should also be available.

For landscapes lying above water level, such data are available in various forms, and may be extracted in particular cost-effectively and in large amounts from satellite images. In addition it is nowadays very easy to determine exactly the relevant location of points lying above water using a satellite navigation system, in particular the GPS system, so that individual data may be referenced by its location and therefore easily and reliably linked.

Ground which lies under water cannot be scanned optically by a satellite. Furthermore, satellite navigation systems do not function under water, since satellite signals cannot be received there.

Known from the company DeepVision AB, Sweden, is a depth logger with which, using sonar located on a boat, depth coordinates of the bottom of a body of water may be recorded together with corresponding satellite position data (GPS data). DeepVision AB also offer side scan sonars, involving a sonar sensor mounted in a submersible and connected by a towing line to a computer located above water, in order to scan objects located to the side of the submersible, using sonar waves.

"Introduction to Photogrammetry", T. Schenk, Department of civil and Environmental Engineering and Geodetic Science, The Ohio State University, Autumn Quarter 2005 (GS 400.2) reveals a general overview of photogrammetry, its theory and its basic functional principles. Photogrammetry is used to record information from surfaces, without physical contact with the objects concerned.

U.S. Pat. No. 5,432,712 discloses a stereo imaging method in which images recorded by different camera modules of a stereo camera are compared in respect of predetermined features (here: edges) and assigned to one another.

Also known are methods for the geometric modelling (CAGD: Computer-Aided-Geometric-Design) by which the form of geometric objects may be described. Geometric objects may be represented for example by free form curves and areas, such as for example hermite curves, Bézier curves, spline curves or NURBS. There is a large number of methods in computer graphics, which work mainly or solely with polygon meshes. Here the surface of an object is represented by polygons, which are often triangles. Methods of polygonization are disclosed for example in "Marching Cubes: A high resolution 3D surface construction algorithm", W. E. Lorensen et al, Computer Graphics, Edition 21, No. 4, July 1987, pages 163-169, or in "Two Algorithms for constructing a Delauny triangulation", D. T. Lee et al, International Journal of Computer and Information Science, Edition 9, no. 3, 1980, pages 219-242, or in "Surface reconstruction from unorganised points" from H. Hoppe, a dissertation, University of Washington, 1994.

Disclosed in Kunz: "Map Building Fusing Acoustic and Visual Information using Autonomous Underwater Vehicles" in Journal of Field Robotics, 2013, 30(5), pages 763-783 is a diving robot, the location of which may be detected continuously by means of a depth sensor and a gyro sensor. The diving robot has a multi-beam sonar, for three-dimensional scanning of the bottom of a body of water. The diving robot also has an individual camera, for optical scanning of the bottom. The individual images recorded by the camera are combined in a mosaic form. The assembled mosaic image may be used as texture on a 3D structure recorded by the multi-beam sonar.

WO 2012/129612 A1 discloses a dive computer (ROV: remotely operated underwater vehicle) which has a system with which it can determine its location coordinates in real time and transmit them to a base station. The base station may be provided with a GPS receiver, wherein the position of the dive computer relative to the base station is determined and exchanged so that, with the aid of this combined information, the position of the dive computer may be determined. The dive computer is equipped with a data acquisition device, e.g. an optical camera, for scanning the bottom of a body of water.

Disclosed by US 2006/0182314 A1 is a method for the display of three-dimensional objects, which are described by three-dimensional data, on a two-dimensional screen. In this method, 3D area data are generated, which are two-dimensional images, wherein the individual image points have a false color corresponding to the distance of the respective image point from the camera with which this image was taken. Such a 3D area image may be shown superimposed by a two-dimensional color image, wherein both images have preferably been taken with the same direction of view.

Other methods by which two-dimensional data are depicted or mapped on a three-dimensional height profile are disclosed by US 2015/0301180 A1, DE 10 2012 103 373 A1, U.S. Pat. No. 6,590,640 B1, also Pelagotti, "Automated Multispectral Texture Mapping of 3D Models", 17th European Signal Processing Conference, Glasgow, pages 1215-1219, and Massot-Campos, "Optical Sensors and Methods for Underwater 3D Reconstruction", Sensors 2015, 15, pages 31525-31557, and 3D Reconstruction Based on Underwater Video from ROV Kiel 6000 Considering Underwater Imaging Conditions", OCEANS 2009-Europe, 2009, pages 1-10.

The invention is based on the problem of creating a scanner for the scanning of the bottom of bodies of water for the automatic generation of underwater maps, with which automatically visualizable underwater maps with high resolution may be generated.

The problem is solved by the subjects of the independent patent claims. Advantageous embodiments are set out in the respective dependent patent claims.

The invention according to the scanner for the scanning of the bottom of bodies of water for the automatic generation of underwater maps includes:

a submersible a camera mounted in the submersible for the generation of image data describing the bottom a referencing device which generates referencing information which is assigned to the image data, so that the position of the section of the bottom shown in the respective image data is defined a 3D scanner which is mounted either on a floating body floating on the water or on a submersible which is connected to the floating body by a towing line.

The mounting of the camera in a submersible makes it possible to position the camera close to the bottom of the body of water, so that the camera can record image data of the bottom with minimal clearance. In this way, image data of high quality is obtained, allowing an underwater map with high resolution to be produced. The image data may be inserted as texture in a three-dimensional relief map, so that by this means a visualizable underwater map is created.

The term "texture" is used in the sense of computer graphics meaning of a covering for three-dimensional models to enhance their degree of detail without however at the same time increasing the degree of detail of their geometry. A texture thus describes an image which is represented on the surface of the three-dimensional model. An image point or pixel of the texture is described as a "texel".

Through the provision of the referencing device, referencing information is assigned to the image data, defining the position of the segment of the bottom shown in the respective image data. As a rule, this referencing information is the position of the submersible or the camera at the point in time at which the image concerned has been made, and the direction of view of the camera. With the aid of this referencing information, in combination with a three-dimensional relief map, the section of the bottom described by the image data may be determined. The referencing information also includes preferably the size of the field of view of the camera, specified e.g. in angular ranges. In the case of a camera with zoom lens, the field of view may be varied, so that here the referencing device also records the respective field of view and assigns the image data. For cameras without zoom lens, the field of view is constant and should not be recorded individually by the referencing device in each case.

A 3D scanner, mounted either on a floating body which floats on the water surface of a body of water or on a submersible body connected to the floating body via a towing line, is therefore to be found on the surface of the water or in an area close to the surface, since the diving depth of the submersible body is limited by the towing line. It is much easier to mount a 3D scanner in a floating body or in a submersible body connected to the floating body by a towing line than in a submarine which may dive freely in a body of water independently of a floating body. Determining the position of a submarine under water is very time-consuming, since its coordinates can only be determined by means of radio navigation when it has surfaced. Consequently, the position during a diving operation has to be tracked by means of one or more inertial sensors and the variations identified by the inertial sensors have to be determined. The position of a floating body may be determined simply by means of radio navigation. If the submersible body is connected to the floating body by a towing line, then only the location of the submersible body relative to the floating body need be determined. This is relatively simple, since the distance between the submersible body and the floating body is limited by the towing line. Moreover, a data or power supply line may run via the towing line, so that data from the submersible body may be transmitted continuously to the floating body and the submersible body must be supplied with power by the floating body. In comparison with a submarine, such a submersible body may be equipped with less computing power, since the data recorded by the submersible body require only intermediate storage and, if applicable, pre-processing in the submersible body and is then transmitted to the floating body over the data line and/or the submersible body does not need an independent power supply.

In the case of mounting of the 3D scanner on the floating body or on a submersible body connected to the floating body by means of a towing line, it is in principle disadvantageous that the 3D scanner is on the water surface or an area close to the surface, so that a bottom at a great depth cannot be scanned with great precision. The inventors have however established that there is an especial need for underwater maps which show precisely the depth profile in the area immediately below the water surface or in the adjacent area below that. For lower-lying areas, the requirements for precision of the depth profile are much less. Typical applications for underwater maps, e.g. for shipping or diving operations, require the most accurate information directly below the water surface, for example to avoid the ship colliding with the bottom. The need for accurately-detailed profiles at great depths of e.g. more than 100 meters is extremely small. The inventors have recognized this and have created a simple scanner for scanning the bottom of bodies of water for the automatic generation of underwater maps, making it possible to produce underwater maps which do full justice to requirements.

By moving over the water surface with a floating body according to the invention or with a floating body to which a submersible body is attached by means of a towing line, the bottom of a body of water may therefore be scanned reliably with the desired precision. In this process, referencing information both for the 3D scanner and also for the camera for producing two-dimensional images of the bottom may be recorded simultaneously, thereby facilitating subsequent combination of the two-dimensional image data of the camera and the three-dimensional relief map which is generated by means of the 3D scanner.

A scanning unit involving a submersible body connected to a floating body by means of a towing line is preferably provided with a 3D scanner on both the floating body and the submersible body. The 3D scanner on the floating body is arranged with its direction of view substantially vertically downwards. The 3D scanner on the submersible body may be aligned with its direction of view arranged horizontally. It may however also be mounted pivotably on the submersible body, so that it may be arranged with its direction of view between different horizontal directions and/or in the vertical direction. By this means the bottom of a body of water may be scanned simultaneously by two 3D scanners which view the same points of the bottom from different directions of view. By combining the 3D data of the two 3D scanners, the resolution may be significantly increased, and undercuts (e.g. caves) may also be shown reliably and correctly. This applies to a deep area, depending on the diving depth of the submersible body and thereby on the length of the towing line.

The referencing device is preferably designed to record the position of the camera and/or the scanner. This position may be determined for example by Cartesian coordinates (X, Y, Z) or also by coordinates from another coordinate system.

The referencing device may have a position logging device with which the position and direction of view of the camera are recorded and stored with assignment to the relevant image data. The position and direction of view of the camera may be stored in the submersible body, together with the corresponding image data, in a memory device mounted in the submersible body. It is however also possible for the referencing information comprising the position and direction of view of the camera to be stored in a control unit located outside the submersible body. This is especially useful if the referencing device or a part of the referencing device is located outside the submersible body, and/or there is a data link between the submersible body and the control unit located outside the submersible body, in order for example to record a large amount of image data over a longer period of time, for storage in a memory device with greater memory capacity outside the submersible body.

Preferably the position logging device has a pressure sensor mounted in the submersible body in order to determine, with the aid of the pressure measured by the pressure sensor, the current depth of the submersible body below the water surface, so that this may be taken into account as a component of the referencing information. Using such a pressure sensor, the depth of the submersible body in the water may be determined very precisely. By this means, a coordinate in the vertical direction (Z direction) of the submersible body is clearly established.

The position logging device may have at least one floating body, such as for example a buoy or a boat, which can float on the surface of the body of water. The floating body is provided with a radio navigation unit, as for example a satellite navigation system or a mobile radio navigation device, in order to log the position of the floating body, and has a relative position device to measure the relative position between the floating body and the submersible body.

The relative position device may include one or more of the following pieces of equipment:
 a towing line by which the submersible body is fastened to the floating body, wherein the length of the towing line determines the distance of the submersible body from the floating body;
 a bar by which the submersible body is fastened to the floating body, wherein the length of the bar determines the distance of the submersible body from the floating body;
 a sonar on the floating body to detect the submersible body;
 a position determination device for the exchange of sound signals between the position determination device and the submersible body, wherein the transit time of the sound signal is measured.

A towing line has the advantage of being very simple and cost-effective, serving at the same time for towing and positioning the submersible body in the water. If the submersible body is towed by a boat, using the towing line, then with a specific speed of the boat in the water and depending on the hydrodynamic design of the towing line and the submersible body, a certain position of the submersible body relative to the boat occurs. These relative positions are measured once empirically for different speeds of the boat in the water, and are stored, thereby allowing in a simple and cost-effective manner the determination of the position of the submersible body relative to the floating body in subsequent operation. If however there are underwater currents or if the boat changes its direction and/or speed, then the actual relative position may differ considerably from the calculated one. Moreover, determination of the relative position using the towing line is difficult if the submersible body is designed to be steerable, so that it may be guided into different depths. In principle it is also possible to generate empirical data for the position of the submersible body relative to the floating body on the basis of the respective depth of the submersible body. It is also to be taken into account that, the longer the towing line, the more inaccurate is the measured relative position.

With a bar, the position of the submersible body relative to the floating body may be determined very precisely. This is of special interest for the scanning of bodies of water up to a depth of around 10 m. This range is of particular importance for shipping. The bar is preferably of sufficient length that the submersible body is approx. 5-7 m below the surface of the water. The floating body is typically a boat. For all sensors mounted on the floating body or boat, the measured values are corrected with the aid of the orientation of the floating body. The orientation of the floating body may be determined by suitable sensors (sensors for the detection of tilt, pitch and toll). On the floating body, measuring instruments, in particular a 2D camera and a 3D scanner, may themselves also be so mounted or suspended as to be tilt-resistant.

With a sonar, which is provided in the floating body, the location of the submersible body may be detected. In particular, the direction of the submersible body relative to the floating body may be detected very precisely. Detection of the floating body by means of the sonar functions well when the submersible body has a certain minimum size and is located not too far from the floating body. Preferably the sonar is used to detect only the direction of the submersible body relative to the floating body, and the distance is determined by a towing line.

A position determination device operating with the exchange of sound signals is described in German patent application DE 10 2016 106 214.6. Between the floating body and the submersible body a sound signal is exchanged, in which at least the time of the sound generation is coded. The sound signal is decoded by the receiver, while the receiver also has a clock to record the time of receipt of the sound signal. From the time of generation and the time of receipt of the sound signal, the transit time of the sound signal is determined. The transit time of the sound signal corresponds to the distance of the submersible body from the floating body. This distance may be combined with a determination of the position of the floating body using a navigation system. Preferably, several different measurements of the distance from the submersible body to the floating body, in particular to two or three floating bodies, are made substantially simultaneously and combined with one another.

The position logging device may also be made independent of a floating body which floats on the water surface. For example, the position logging device may have one or more inertial sensors for detecting the position of the submersible body under water. With such inertial sensors, the acceleration of the floating body is measured. The position is determined from the integral of the acceleration. Before immersion of the submersible body in the water, the position is preferably calibrated by means of a navigation device, i.e.

the current location of the submersible body is determined so that, by means of the inertial sensor or sensors, the position of the submersible body may be recorded relative to the calibrated position. Preferably the inertial sensor or sensors are provided combined with a pressure sensor, with the pressure sensor being used to determine depth, so that the depth measured by the inertial sensors may be corrected during the diving operation.

Preferably a clock is provided in the submersible body. Such a clock may be used to generate time stamps, in order for example to provide the recorded image data with a time stamp which indicates the time at which the image data were generated.

The submersible body may be in the form of a manned or unmanned submarine with its own drive for movement in the water. If the submersible body is an unmanned submarine, then it is preferably designed for remote control. The remote control may be effected by means of a connecting line, in which is provided at least one data line for transmission of the control data. The connecting line may also have a line for the transmission of electrical power to the submarine. Remote control of an unmanned submarine may also be effected by means of sound signals, on which the relevant control signals are coded.

The scanner may have both a 2D camera and also the camera for generating the two-dimensional image data describing the bottom, and also a 3D scanner for generating three-dimensional information describing the bottom. The two-dimensional image data generated by the 2D camera are preferably used as texture for a relief map, while the three-dimensional information describing the bottom may be used to generate the relief map.

The 2D camera and the 3D scanner may each be mounted in a submersible body. They may also be mounted in the same submersible body. In addition or alternatively, a 2D camera and/or a 3D scanner may also be mounted in a floating body, in particular a boat.

Preferably at least two 3D scanners are provided in such a way that the bottom may be scanned from different directions.

According to a further aspect of the present invention, a method of generating underwater maps is provided, in which the following steps are performed:
provision of two-dimensional image data of the bottom of a body of water together with reference information
provision of a three-dimensional polygonized relief map of a predetermined area of a bottom of a body of water, and
depiction or mapping of the two-dimensional image data as texture on the three-dimensional polygonised relief map by means of the reference information.

According to the invention, two-dimensional image data of a bottom of a body of water together with reference information are provided, by which means they may be mapped simply and reliably as texture on the three-dimensional polygonised relief map. By this means, a visualizable underwater map is generated.

The use of polygonized relief maps allows the recording of a three-dimensional contour with a very small amount of data. In the case of heavily contoured areas, these may be represented precisely by small polygons, whereas in the case of less contoured areas, the amount of data may be kept very small by the use of suitably large polygons. In addition, the polygons form surfaces on which the texture may be mapped very easily.

Preferably, such a polygonized relief map may be supplemented area by area by detail geometric data.

The combination of the use of a polygonized relief map and two-dimensional image data which is mapped as texture on the three-dimensional polygonised relief map therefore provides with a small amount of data a three-dimensional representation which is very true to reality.

According to a further aspect of the invention, a method of generating underwater maps is provided, in which the following steps are performed:
provision of two-dimensional image data of surface of the object, such as e.g. the bottom of a body of water together with reference information
provision of a three-dimensional relief map of a predetermined area of the object or the bottom of a body of water, and
mapping of the two-dimensional image data as texture on the three-dimensional relief map by means of the reference information, wherein the three-dimensional relief map is already provided, by scanning the bottom of the body of water with a 3D scanner mounted on a floating body or submersible body which is so connected to a radio navigation unit that position coordinates determined by the radio navigation unit are assigned as reference information of the three-dimensional relief map.

By scanning the bottom with a 3D scanner mounted on a floating body or submersible body which is connected to a radio navigation unit so that position coordinates determined by the radio navigation unit are assigned as reference information of the three-dimensional relief map, very precise reference information is assigned to the three-dimensional relief map. Such a connection is possible in practice only on the surface of a body of water or up to a minimal depth. However, this is not a drawback for the present invention since, with underwater maps, the depth profile in the area immediately below the water surface is of greatest importance, and the adjacent area below that is of major importance. For lower lying areas, the requirements for the precision of the depth profile are significantly less. The typical applications for underwater maps, e.g. shipping or diving operations, require the most precise information immediately below the water surface, in order for example to avoid a ship colliding with the bottom. The requirement for true detail profiles at great depths, of e.g. more than 100 meters, is extremely low. The inventors of the present invention have recognized this and have accordingly found a solution for the production of underwater maps in a very simple manner and having the necessary precision in the areas of importance to the user.

Due to the fact that the reference information for the 3D scanner is generated by means of continuous determination of the coordinates by a radio navigation unit, evaluation of the 3D data generated by the 3D scanner is much simpler than for 3D data generated by a 3D scanner provided on a submarine. In the case of a submarine, the position of the submarine and with it the 3D scanner under water must be detected by means of one or more inertial sensors and updated from an initial position determined when the submarine was on the surface. This is much more laborious, and deviations increasingly continue and increase. Consequently, data recorded in this way must be aligned in another way. This may occur for example by extracting characteristic points in individual images, so that the individual images may subsequently be assembled to form a mosaic. By this means it is possible to compensate for inaccuracies in the location finding of the submarine and with it the 3D scanner. This is however not necessary with a precise determination of the location of the floating body or the submersible body by means of radio navigation.

Preferably the relief maps and the 3D information are generated by a sonar mounted on a floating body (boat or ship) or submersible body.

The two-dimensional image data of the bottom of the body of water together with the reference information may be produced by a scanner, as explained above.

To map the two-dimensional image data as texture on the three-dimensional relief map, the two-dimensional image data are transformed into a texture space by means of the reference information, the assignment of the points in the texture space to the respective points in the relief map is determined by means of the reference information, and color values of points of the texture space are mapped on the assigned points in the relief map.

It is also possible for several color values of different two-dimensional image data to be assigned to one point of the relief map, wherein the several color values are interpolated or averaged.

To provide a three-dimensional relief map, a bottom of a body of water may be scanned from two different directions. The information obtained in this way is put together to generate the three-dimensional relief map.

The two different directions enclose preferably an angle of at least 30° C. or at least 60° C. and are in particular roughly orthogonal to one another. The different angles may also be aligned to one another horizontally and vertically.

The inventors have recognized that, in scanning from only one direction, there is the problem that, with differing inclination of the bottom, the corresponding surfaces in a relief map are shown with varying resolution. A steep wall, scanned only from above, is recorded by only a few scanning points. If the steep wall is scanned from the side, then it is recorded by many points. By combining scans from two different directions it is possible to generate a three-dimensional relief map in which resolution is roughly equal in all directions and is independent from the slope of the scanned surfaces.

There is also a problem with scanning of the bottom from only one direction, that if the resolution of the relief map is too coarse then the surfaces are apparently smoothed by this, so that a texture mapped on them and showing fine structures, seems very unrealistic. This problem is eliminated by scanning from different directions, since by this means the resolution can be kept roughly the same, irrespective of the slope of the bottom.

The scanning from two different directions may be carried out using a method for the generation of three-dimensional information, such as e.g. sonar scanning, or scanning using a stereo camera or a time-of-flight camera.

In describing the accuracy of the relief map, a distinction is made between the resolution, i.e. the spacing of the individual data points, and the precision of the individual data points. The relief map should as far as possible have points with a maximum spacing of 20 cm. Preferably the spacing is smaller, in particular 10 cm or 5 cm. The precision of the individual points should be at least 20 cm.

A relief map may be represented by a three-dimensional data cloud. The three-dimensional data cloud is a list of points in the three-dimensional space which is specified in each case by three coordinates (X, Y and Z coordinates). These points represent in each case a point on the bottom of the area described by the relief map. With such a data cloud, undercuts such as caves or the like may be represented. Alternatively the data points may also contain values, in particular vectors, which point towards the surface of the bottom. These values are preferably provided only for data points located adjacent to the surface of the bottom.

If the reference information contains the direction of view used to record the two-dimensional image data, then, in mapping the two-dimensional image data as texture on the three-dimensional relief map, the two-dimensional image data may be weighted in inverse proportion to the deviation of the direction of view from the normal of the area of the three-dimensional relief map on which the two-dimensional image data are mapped. This means that, in other words, the more the direction of view deviates from the normal of the surface of the relief map, the less the weighting of the corresponding two-dimensional image data used as texture. Preferably the bottom is recorded several times from different directions to generate image data describing the bottom.

Figure 2:
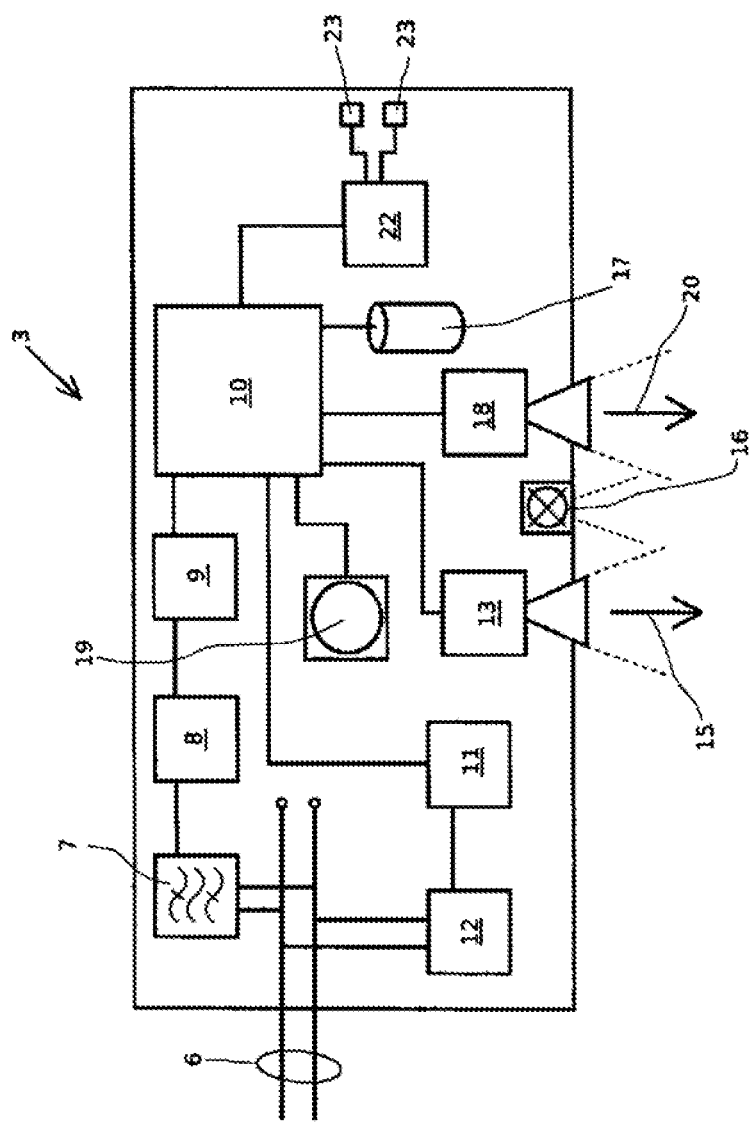

The invention is explained below with the aid of the drawings, which show schematically in:

FIG. 1 a first embodiment of a scanner for scanning the bottom of bodies of water, with a submersible body on a towing line FIG. 2 a schematic block diagram of the submersible body of FIG. 1

Figure 3:
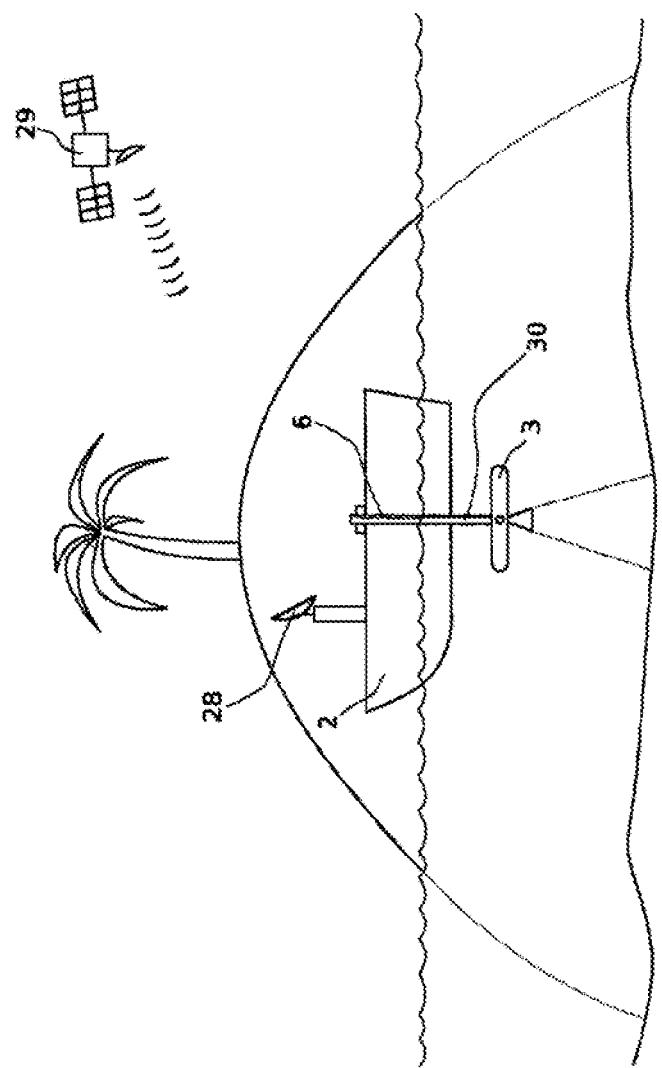
Figure 4:
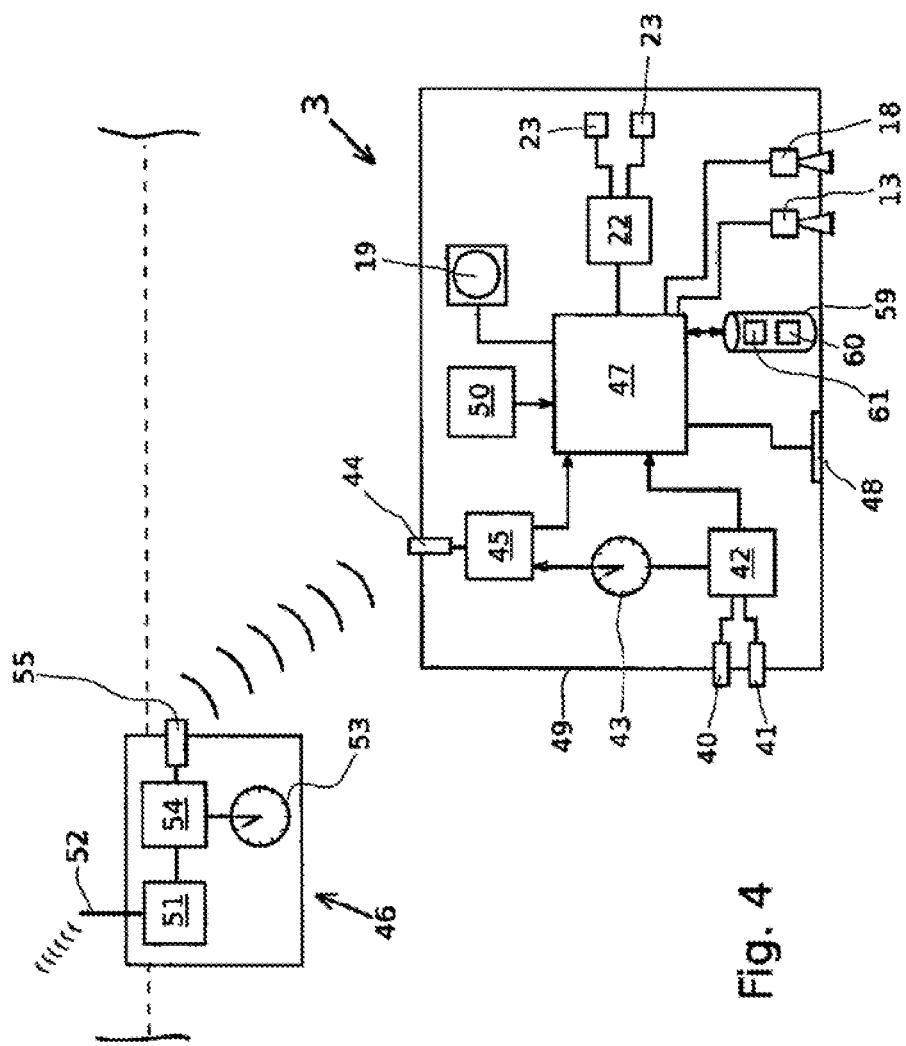
Figure 5:
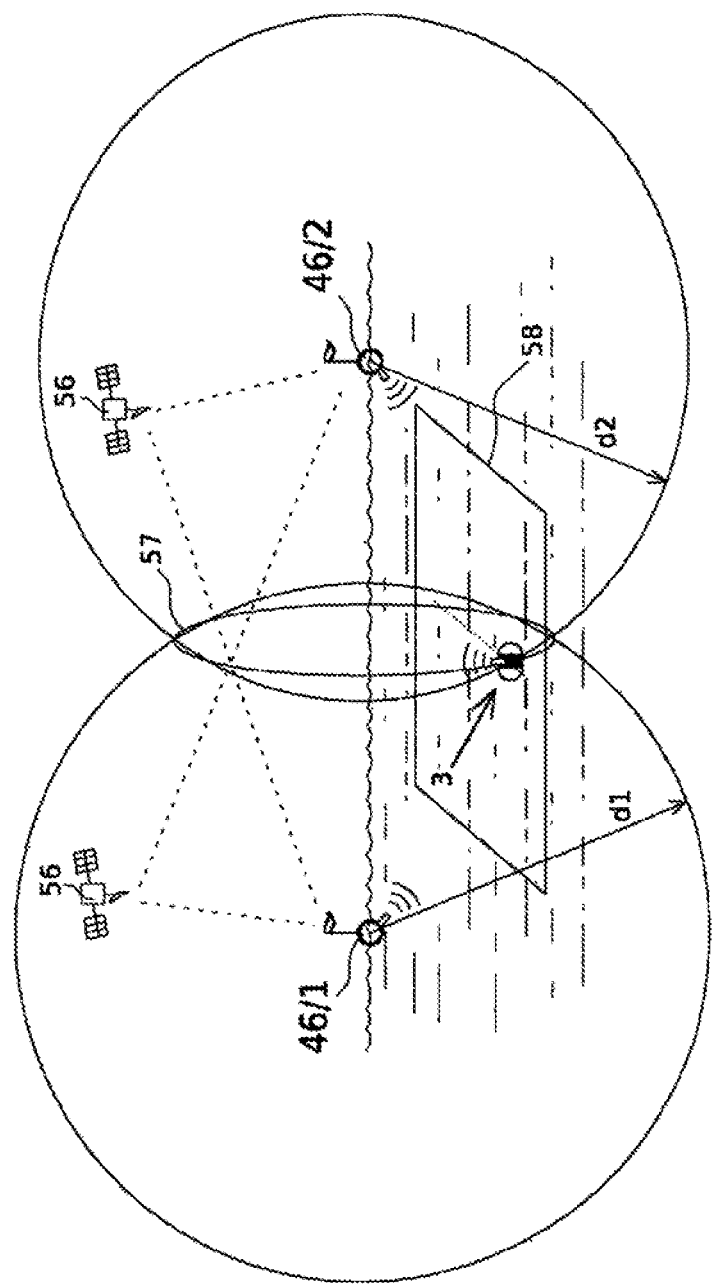
Figure 6:
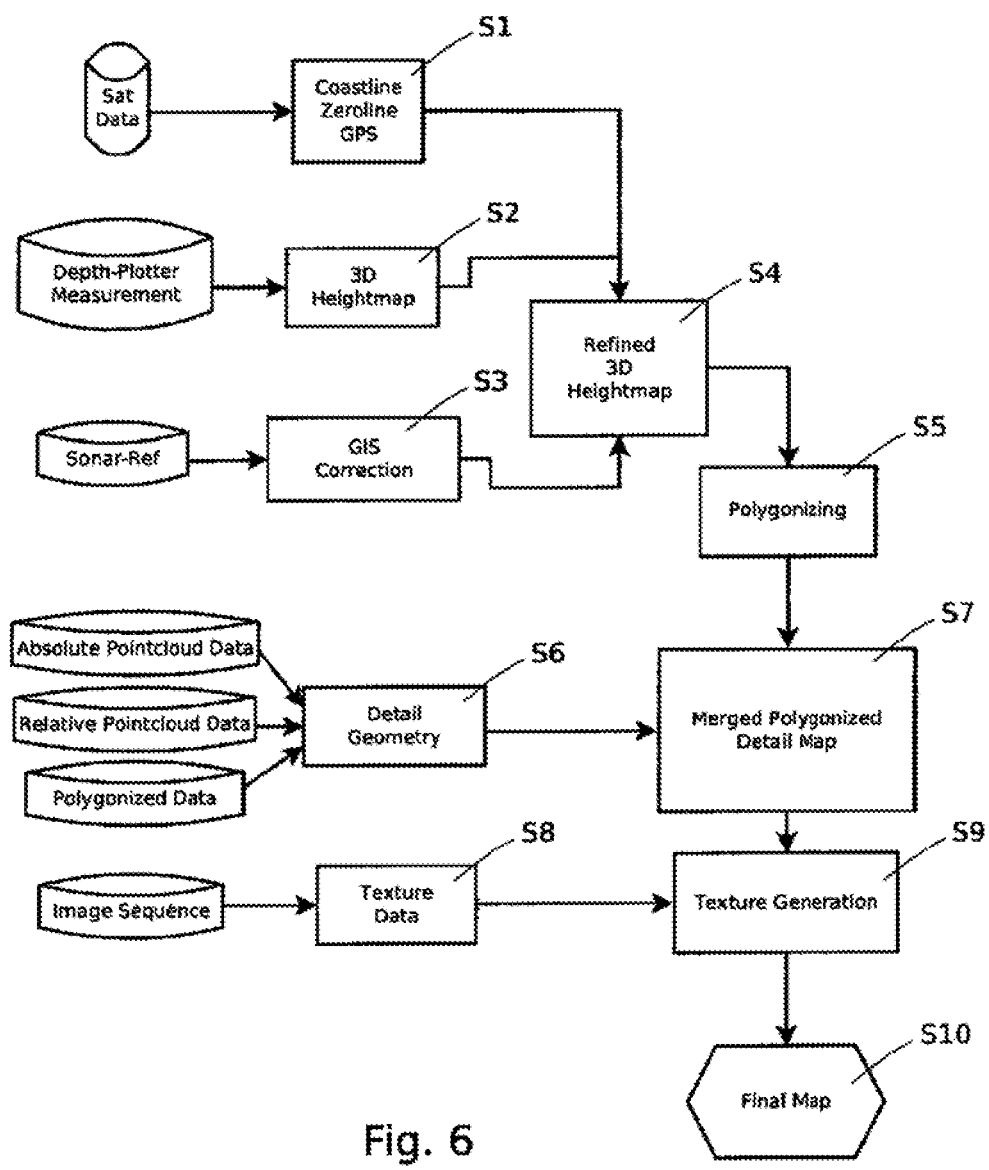
Figure 7:
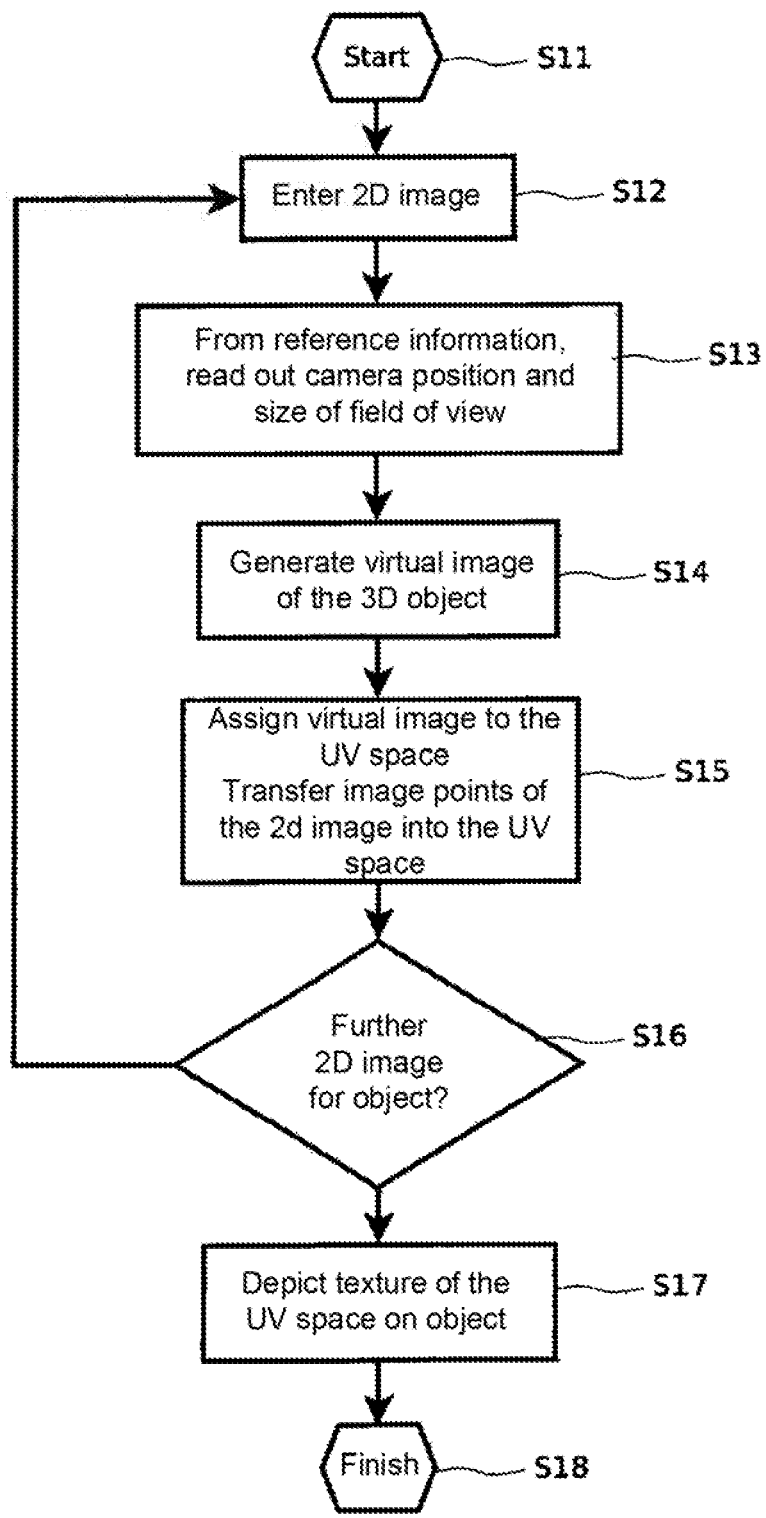
Figure 8:
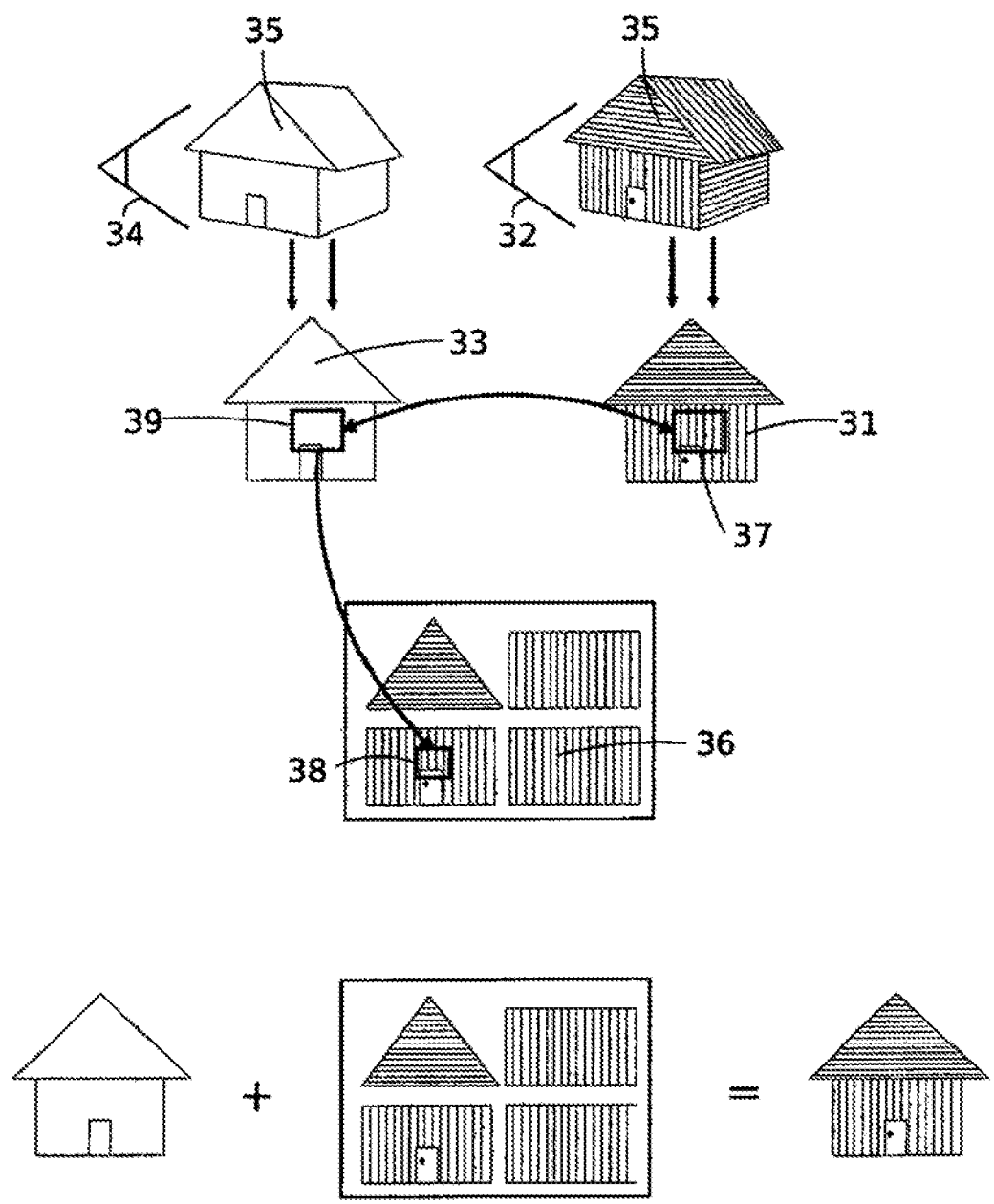

FIG. 3 a second embodiment, with a scanner in which the submersible body is attached to a boat by means of a bar FIG. 4 a third embodiment of a scanner with a floating body and a submersible body, wherein position determination of the submersible body is effected by means of sonar signals FIG. 5 a schematic view of the arrangement of two floating bodies and one submersible body in the water according to the third embodiment FIG. 6 a flow chart showing a method of generating underwater maps FIG. 7 a method for the generation of texture, and FIG. 8 the method of FIG. 7 with the aid of specimen images.

The invention relates to a method for the generation of underwater maps. A first aspect of the invention covers the generation of information on the bottom of a body of water using a suitable scanner 1. A second aspect of the invention relates to the generation of underwater maps wherein, for this purpose, the information obtained using the scanner 1 according to the invention may be used. The underwater maps may however also be generated from corresponding information from other information sources.

A first embodiment of a scanner 1 comprises a floating body 2 and a submersible body 3 (FIG. 1). The floating body 2 is in this embodiment a boat or a ship floating on a water surface 4 of a body of water. The submersible body 3 is connected by a towing line 5 to the floating body or boat 2.

The towing line contains a two-wire cable 6 for supplying the submersible body 3 with electrical power in the form of direct current (FIG. 2). Sections of the two wires of the cable 6 are shown only schematically in FIG. 2. This cable 6 is connected to all electrical equipment of the submersible body 3 in order to provide it with power.

This cable 6 is also used as data line, by means of a frequency signal fed to or branched off from the cable. For this purpose the submersible body 3 has a bandpass filter 7 which is connected to the cable 6 and acts as a diplexer, so that the frequency signal over the bandpass filter 7 is decoupled from the cable 6. Connected to the bandpass filter 7 is a demodulator 8 which demodulates the frequency signal and generates an analog data signal. The analog data signal is converted by an A/D converter 9 into a digital data signal, which is fed to a central control unit 10. The central control unit 10 is connected to a D/A converter 11, which receives digital signals from the central control unit 10 and converts them into analog signals. Connected to the D/A converter is a modulator 12, which modulates the analog signals of the D/A converter to a predetermined frequency or a predetermined frequency range. The modulator 12 is connected to the cable 6, so that the modulated signal is fed to the cable 6. The central control unit 10 is thus able to send data over the cable 6, via the D/A converter 11 and the modulator 12.

The submersible body 3 is provided with a 2D camera 13, which in the present embodiment is a camera in the visible wavelength range. In the context of the invention, the 2D camera may also be designed to receive other wavelength ranges, in particular as an infrared camera. The 2D camera may also be in the form of a sonar.

Using the 2D camera, a two-dimensional image of the bottom 14 of the body of water is generated.

The 2D camera 13 is mounted on the submersible body 3 with its direction of view 15 directed downwards. The 2D camera 13 may however also be mounted pivotably on the submersible body 3 so that its direction of view may be directed vertically downwards or horizontally to the side or in any desired intermediate position. The submersible body 3 may also have several 2D cameras 13, mounted with their directions of view in different directions. Preferably the submersible body 3 has at least two 2D cameras 13, with their directions of view 15 aligned orthogonally to one another. In the context of the invention it is also possible to control a rotary position around a horizontal longitudinal axis of the submersible body 3 in such a way that one or more 2D cameras 13 may be arranged in the water with different directions of view 15.

The submersible body 3 may also have an illuminating device 16, which emits light in a wavelength range matched to the sensitivity of the 2D camera. Such an illuminating device 16 is expedient if the submersible body 3 is to be used at depths reached by little daylight.

The floating body 2 has a first 3D scanner 18 and a second 3D scanner 19. The first 3D scanner 18 is aligned with its direction of view 20 facing downwards and the second 3D scanner 19 has its direction of view facing horizontally to the side (perpendicular to the plane of the drawing in FIG. 2). In the present embodiment, each of the 3D scanners 18, 19 is in the form of a sonar. They therefore have in each case a transmitter and a receiver for the sending and receiving of sonar signals. The 3D scanners 18, 19 are used to provide information for a three-dimensional surface structure. Instead of a sonar, other devices may also be used for the three-dimensional scanning of surfaces, such as for example a stereo camera or a time-of-flight camera. With sonars, very reliable 3D information may be obtained under water, irrespective of the turbidity of the water, for which reason sonars are the preferred 3D scanning equipment. In the context of the invention, however, the submersible body 3 may have only a single 3D scanner, for which different directions of view may be set by swivelling the 3D scanner on the submersible body using a suitable swivelling device, or by control of the rotary position around a horizontal longitudinal axis of the submersible body 3.

The submersible body 3 has rudders 21 which are used to control the diving depth and/or the rotary position around a horizontal longitudinal axis of the submersible body 3. To drive the rudders, the submersible body 3 is provided with a rudder control device 22, which drives the rudders 21 by suitable positioning elements 23. The rudder control device 22 is connected to the central control unit 10, from which it receives suitable signals for changing the position of the submersible body 3.

Provided on the floating body or boat 2 is a 3D scanner 24, for scanning the bottom of the body of water and generating three-dimensional information relating to the body of water. The 3D scanner is mounted on the boat 2 with its direction of view 25 facing downwards. In the present embodiment, the 3D scanner 24 is a sonar. It may however be any other device suitable for generating three-dimensional information of a surface.

The boat 2 also has a submersible-body scanner 26, which in the present embodiment is a sonar. The submersible-body scanner 26 is arranged with its direction of view, seen from the boat 2, looking downwards at an angle towards the rear, so that the submersible body 3 lies in the field of view of the submersible-body scanner 26 when pulled by the boat 2 by means of the towing line 5. By this means, the position of the submersible body 3 relative to the floating body or boat 2 is determined. In the present embodiment, the submersible-body scanner 26 is a sonar. Using the sonar, the exact position of the submersible body 3 relative to the boat 2 may be determined. It is in principle also possible to use another kind of scanner, such as for example a camera, with which only a two-dimensional image may be generated. From the two-dimensional image, only the direction relative to the boat 2 in which the submersible body 3 is to be found may be determined. In combination with the length of the towing line 5, the position of the submersible body 3 relative to the boat 2 in three-dimensional space may be determined.

The floating body or boat 2 has a satellite navigation system 28, as for example a GPS system, which is able to receive position-finding signals from satellites 29, in order to determine the position of the floating body or boat 2.

The position of the boat 2 may thus be determined with the aid of the satellite navigation system 28. Using the submersible-body scanner 26, the position of the submersible body 3 relative to the boat 2 may be determined. Since the absolute position of the boat 2 is known, the absolute position of the submersible body 3 may also be determined from the relative position finding.

With recording of two-dimensional image data of the bottom of the body of water using the 2D camera 13 of the submersible body 3, and recording of three-dimensional information of the bottom of the body of water by means of the 3D scanners 18, 19, the location of the submersible body 3 in three-dimensional space is determined simultaneously. This location information is then assigned to the respectively recorded two-dimensional images and the respectively recorded 3D information as reference information. This assignment may be effected for example by simultaneous recording of the two-dimensional images and 3D information, and simultaneous determination of location, wherein the relevant data are then linked together. It is however also possible to provide both the two-dimensional images and the 3D information together with the location information with a time stamp, with suitable clocks being provided for this purpose in each case. With the aid of the time stamp it is then possible afterwards to link the location information with the two-dimensional images and the 3D information.

The location of the submersible body 3 in three-dimensional space may also be determined at predetermined time or location intervals, with the option, as required, of interpolating location coordinates in the area between two location determination points. The scanning frequencies of the 2D camera, the 3D scanner and the radio navigation unit may therefore differ, while the corresponding location coordinates may in each case be interpolated individually for the assignment to the two-dimensional images or to the three-dimensional data.

The means of determining the location information of the submersible body 3 thus serve as referencing device and the location of the submersible body 3 as referencing information. The use of location information as referencing information permits very simple, rapid and precise assignment of the two-dimensional images to the three-dimensional relief maps.

The submersible body 3 may also have a tilt sensor and/or inertial sensor, with which the inclination relative to the vertical may be determined. With the aid of this angle of inclination, in combination with the direction of travel of the boat 2 and thus the towing direction in which the submersible body 3 is towed in the water, the alignment of the submersible body 3 in three-dimensional space and thus the directions of view of the 2D camera and the 3D scanners are determined. These directions of view may likewise be used as referencing information.

The 2D camera may also be provided with a zoom lens, with which the field of view of the camera may be changed. The setting of the zoom lens may be described by means of a magnification scale or the field of view can be described by an angular range. Values which describe the field of view may similarly be used as referencing information for the respective camera 13.

With the scanner 1 described above it is therefore possible to scan the bottom of a body of water and to generate image data which describe the bottom of the body of water, while at the same time referencing information is generated and assigned to the image data, so that the position of the segment shown in the respective image data are defined. This applies especially to two-dimensional images. However, the three-dimensional information may equally well be referenced by means of the reference information.

The two-dimensional image data generated in this way may then be integrated easily in an existing relief map. The 3D information may be used for generation or to optimize (refine) an existing relief map.

The referencing information described above is sufficient to reproduce the two-dimensional image data on the relief map. It is not necessary to extract characteristic points of the two-dimensional images and mutually align the two-dimensional images and/or to extract characteristic points of the individual three-dimensional views generated by the 3D scanner, in order to align these with one another and/or to align the two-dimensional images to the relief map. In principle, such information may certainly be used additionally, but it is not essential.

In the second embodiment of a scanner 1 according to the invention, the submersible body 3 is attached to the floating body 2 by means of a bar 30 (FIG. 3). The floating body or boat 2 corresponds in its design substantially to the floating body or boat 2 according to the first embodiment. The submersible body 3 of the second embodiment also corresponds substantially to the submersible body of the first embodiment. Here, however, the cable 6 is guided along the bar 30. With this embodiment, no submersible-body scanner is needed, since the relative position of the submersible body 3 with respect to the floating body 2 is clearly fixed by the rigid bar 30. It is however expedient to integrate in the boat 2, sensors for the detection of tilting, pitching and rolling of the boat, so as to make it possible to determine the alignment of the boat in three-dimensional space. In conjunction with the position determination by means of the satellite navigation system 28, with the aid of the sensors for the detection of tilting, pitching and rolling of the boat, the exact position of the submersible body 3 and its alignment may be determined. Thus, referencing information may be produced which can be linked with the image data and three-dimensional information generated.

The second embodiment is useful especially for the scanning of flat bodies of water with a maximum depth of 20 m, in particular a maximum of 10 m, or for the scanning of bodies of water close to the shore. Such depths of water are of special interest for shipping. A third embodiment is shown in FIGS. 4 and 5. In this embodiment, the submersible body 3 is in the form of a remote-controlled submarine or drone receiving sound signals from two floating bodies 2, with the aid of which the submersible body 3 can determine its exact position in three-dimensional space. The submersible body 3 is provided with a pressure sensor 40 and a temperature sensor 41, which are connected to a first sensor controller 42. Also connected to the first sensor controller 42 is a clock 43. The first sensor controller 42 may tap relevant sensor signals at the pressure sensor 40 and the temperature sensor 41, converting them into a corresponding digital pressure value or temperature value. In addition, the first sensor controller 42 can also provide the individual pressure values and temperature values with a time stamp.

The submersible body 3 also has a hydrophone 44, with which sound signals can be received and converted into electrical signals. The hydrophone is connected to a second sensor controller 45, which can record the electrical signals generated by the hydrophone. The second sensor controller 45 is designed to extract time and location information from the received sound signals.

In the present embodiment a transmitting device 46, explained in detail below, generates a sound signal on which a digital signal is modulated, with the digital signal containing the time and location information. This digital signal is extracted from the second sensor controller 45 and the corresponding location and time information is made available. The second sensor controller 45 is also connected to the clock 43 and can provide the received location and time information with a time stamp, giving the time at which the relevant sound signal was received by the hydrophone 44.

The first sensor controller 42 and the second sensor controller 45 are each connected to a microcontroller 47. The microcontroller 47 has a link to an external interface 48, to which a computer may be connected. The submersible body 3 is mounted in a waterproof housing 49. The sensors 40, 41 and 44 each extend through an opening of the housing 49, with a waterproof seal against the respective opening.

The submersible body 3 has an inertial sensor 50, with which the direction of movement of the submersible body 3 may be detected. The inertial sensor 50 is connected to the microcontroller 47.

The transmitting device 46 has a GPS receiver 51, which is connected to an aerial 52 for the receiving of satellite signals. The transmitting device 46 has a clock 53. The GPS receiver 51 and the clock 53 are each connected to a transmitter circuit 54 which generates a transmission signal which can be output by means of a hydro sound source 55. The transmitter circuit 54 is so designed that it modulates on to the transmission signal both the time of signal generation and the location determined by the GPS receiver 51. The transmitted sound signal thus contains the location and time information indicating when and where the signal was generated. The clock 43 of the submersible body 3 and the clock 53 of the transmitting device 46 are synchronized with one another. These clocks 43, 53 are preferably radio clocks, so that they are synchronized regularly by a central radio clock. In principle it is however also possible to equip the submersible body with a hydro sound source and the transmitting device 46 with a hydrophone, so that the submersible body 3 and the transmitting device 46 can exchange bidirectional sound signals in order to synchronize the respective clocks 43, 53 with one another.

The method of operation of the submersible body 3 according to the invention for determining the position under water will be explained below with the aid of the schematic drawing in FIG. 5. Here a system with two transmitting devices 46/1 and 46/2 is used. The transmitting devices 46/1 and 46/2 receive with their respective GPS receivers 51 satellite signals from GPS satellites 56. With the aid of these satellite signals, the GPS receivers 51 determine in each case the location of the respective transmitting devices 46/1 and 46/2. The two transmitting devices 46/1 and 46/2 each transmit a sound signal in which the location of the respective transmitting device 46/1 and 46/2 and the time of sound generation are encoded. By this means, each of these sound signals contains information on the location and time of its generation. The sound signals are emitted into the water by the respective hydro sound sources 55.

The two transmitting devices 46/1 and 46/2 are each provided on buoys, boats or ships floating freely on a water surface. The transmitting devices 46/1 and 46/2 are preferably located at a distance of at least several metres, preferably some ten metres, from one another.

The submersible body 3 receives by means of the hydrophone 44 the sound signals of the two transmitting devices 46/1 and 46/2. The sound signals are decoded by the second sensor controller 45 and provided with a time stamp giving the time at which the respective sound signal was received from the submersible body 3. This information is passed on by the second sensor controller 45 to the microcontroller 47. From the sending time of the sound signal and the receipt time of the sound signal, the microcontroller 47 determines the transit time of the sound signal. With the aid of the sound velocity in the water, the transit time is converted into a distance. This is the distance d1 or d2 of the location encoded in the sound signal. Thus, in the submersible body 3, the distances d1 and d2 to the respective transmitting devices 46/1 and 46/2 are known.

As may be seen in FIG. 5, all points with the distance d1 or d2 lie on a sphere around the respective transmitting devices 46/1 and 46/2. The two spheres intersect in a circle 57. The location of the submersible body 3 must therefore lie on this circle 57.

The water pressure is measured by the pressure sensor 40. From the water pressure, the microcontroller 47 calculates the depth of the submersible body 3 relative to the water surface. This depth defines a certain level or a certain plane 58 which intersects the circle 57 at two points. Since the submersible body 3 must lie on this level 58, the position of the submersible body is fixed to one of these two intersections. These two intersections are arranged with mirror-symmetry to a vertical plane of symmetry running through the two transmitting devices 46/1 and 46/2.

If the submersible body 3, relative to this plane of symmetry, is moved a little towards the plane of symmetry or a little away from the plane of symmetry, this can be detected by the inertial sensor 50. The inertial sensor 50 passes the direction of movement to the microcontroller 47. The microcontroller 47 determines the movement component perpendicular to the plane of symmetry.

Before and after this movement, at least two positions of the submersible body 3 are determined with the aid of the sound signals and the pressure sensor. These positions are still ambiguous, since they may be located on both sides of the plane of symmetry. The points in time of these two positions are also established, so that the movement direction of the submersible body 3 may be determined with the aid of these two positions. The movement component perpendicular to the plane of symmetry is, for the present two options, in each case aligned opposite on both sides of the plane of symmetry. These movement directions are compared with the direction of movement recorded by the inertial sensor 50, wherein the positions on the side of the plane of symmetry showing the same movement direction as the inertial sensor 50 are rated as correct. In this way the position of the submersible body 3 may be determined unambiguously. This position is then determined by three coordinates (X, Y, Z) relative to the two transmitting devices 46/1 and 46/2 or relative to a coordinate system preset by the GPS satellite system. The coordinates and the corresponding time stamp of the respective position of the submersible body 3 are stored in a memory device 59 in a predetermined log record 60.

This submersible body 3 has, exactly like the submersible body 3 of the first embodiment according to FIG. 2, a 2D camera 13 and two 3D scanners 18, 19. The scanners 13, 18, 19 may be of exactly the same design as in the first embodiment, for which reason reference is made to the latter.

In addition, once again the submersible body 3 is provided with rudders, which are designed to control the depth of submersion and/or the rotary position around a horizontal and/or vertical longitudinal axis of the submersible body 3. To drive the rudder, the submersible body 3 is provided with a rudder control device 22 which drives the individual rudders with suitable control elements 23. The rudder control device 22 is connected to the central control unit 47, from which it receives suitable signals for changing the position of the submersible body 3. If the submersible body 3 is an autonomously operated submersible body, then it also has a drive unit (not shown), by which the submersible body 3 may be moved along in the water.

The images generated by the scanners 13, 18 and 19 are preferably provided with a time stamp by the microcontroller 47 and stored in the memory device 59 in an image record 61.

The location stored in the log record 60 serves as referencing information for the image data contained in the image record 61. The referencing information of the log record 60 is linked to the image data of the image record 61 in each case by a time stamp. Preferably, in addition to the location, the alignment of the submersible body 3 is also stored in the log record 60, so that in each case the direction of view of the camera 13 or scanner 18 may be assigned to the image data contained in the image record 61.

In this embodiment, the submersible body 3 is connected to the radio navigation unit (GPS receiver) of the transmitting devices 46/1 and 46/2. By this means, the three-dimensional coordinates of the submersible body 3 may be determined at any time. Such a connection of the submersible body 3 to the radio navigation unit is not possible to any desired depth since on the one hand the sound signals have a limited distance of transmission and on the other hand the distance of the transmitting devices 46/1 and 46/2 limits location resolution at greater depths. Such connection of the submersible body 3 to the radio navigation unit is especially very efficient and reliable in areas of the body of water close to the surface, up to a depth of e.g. 100 m.

A method of generating underwater maps is explained below, by way of example, with the aid of FIG. 6.

In a step S1, firstly satellite data or nautical maps are read in and shorelines extracted. If the input data involves relief maps, then all points with a height zero (Z=0) are extracted.

With the 3D information obtained from the 3D scanner 24 mounted on the boat 2, a rough 3D relief map is generated (step S2). The accuracy of this 3D relief map is around 1 m.

In step S3, the 3D information recorded by the 3D scanners 18, 19 which are mounted on the submersible body 3 is put together. Preferably the 3D scanners 18, 19 scan the bottom from different directions, in particular orthogonal to one another, by which means, irrespective of the slope of the surface of the bottom, a roughly uniform resolution of the 3D information is obtained. Referencing information describing the segment of the mapped bottom is assigned to this 3D information. With the aid of this referencing information, this 3D information is added to the 3D relief map from step S2 and the shorelines from step S1 (step S4), so that a 3D relief map with a resolution of less than 1 m is generated.

In step S5, the 3D relief map is polygonized. This may be carried out for example using the method according to D. T. Lee et al (Two algorithms for constructing a Delaunay triangulation) explained at the beginning.

Optionally, detailed geometric data from various data sources may be selected (step S6). The data sources may be absolute point cloud data, relative point cloud data or a polygonized object. Such data sources are to some extent available for corals, wrecks or other objects of great interest. This data may also be recorded additionally for such objects. A suitable method of obtaining high-resolution 3D information is photogrammetry. Photogrammetry covers various methods of generating 3D information. In the present embodiment, the objects are scanned from different directions using a camera. The images of the objects thus generated undergo a feature analysis. With the aid of the features, an assignment of the individual features into the different images is made, from which the three-dimensional body or the three-dimensional object may be modelled. By this means, a very precise representation of the three-dimensional objects is created in a simple manner, and scanning of the object from different directions by means of a camera is also readily possible under water. Alternatively, the 3D information may also be generated by means of a stereo camera and a suitable method for the evaluation of stereo images.

In step S7, this detailed geometric data may be added to the polygonized relief map.

In step S8, two-dimensional image data of the bottom are read in. The two-dimensional image data contain reference information describing the segment of the bottom mapped by the respective image data. By this means, the two-dimensional image data may be added as texture to the three-dimensional relief map obtained in step S5 or S7, taking into account the referencing information assigned to the relief map (step S8). Preferably the reference information of the two-dimensional image data contains in each case the location and the direction of view of the camera with which the image data was recorded. In mapping the two-dimensional image data as texture on the three-dimensional relief map, the two-dimensional image data are weighted in inverse proportion to the deviation of the direction of view from the normal of the area of the three-dimensional relief map on which the two-dimensional image data are mapped. This means, in other words, that the more the direction of view differs from the normal of the surface of the relief map, the less the corresponding two-dimensional image data are adopted as texture.

In step S9, therefore, the final underwater map is generated, and is output in step S10.

As compared with conventional methods, this method has the following advantages:

1. The individual steps may be executed entirely automatically. The use of referencing information (especially location information), in particular for the 3D information with high resolution used in step S3 and/or the two-dimensional image data used in S8, allows the automatic integration of this information with the relevant existing 3D relief map. With steps S3 and S4, a rough and easily created 3D relief map is so far refined that its resolution is so high that the integration of two-dimensional image data as texture does not lead to any unnatural impressions. Rated as a natural impression is the appearance of the bottom that a diver sees with the human eye from a distance of around 2-5 m.

2. The combination of 3D information which has been recorded from two different directions, preferably orthogonal to one another, allows the generation of a relief map with substantially uniform resolution, irrespective of the slope of the bottom which is mapped.

3. The use of two-dimensional image data as texture for a three-dimensional underwater map results in a 3D map which on the one hand reproduces the contour of the bottom with a resolution which is sufficiently precise for diving or for shipping, and on the other hand reproduces the appearance of the bottom in a natural way.

4. If the two-dimensional image data has been taken from different directions and weighted according to the deviation from the normal of the bottom, then a very natural representation is obtained, since distortions due to the direction of view are considerably reduced.

With the aid of FIGS. 7 and 8, a method is explained below, describing how the two-dimensional image data input in step S8 are converted into a texture which can be mapped on the three-dimensional relief map.

This method commences with step S11. In step S12, a two-dimensional image of the bottom is read in. The two-dimensional image is a color image 31 (FIG. 8).

This two-dimensional image contains reference information from which, in Step S13, the camera position from which the two-dimensional image has been taken, and the size of the field of view of the real camera 32 are read out.

The virtual object, which may be an object located on the bottom, is known with the aid of the detail geometric data from step S6, or the virtual object is a section of the bottom described by the polygonised 3D relief map according to step S5. The geometry of the three-dimensional object is therefore available with high precision. Only the surface character of this three-dimensional object is revealed neither by the relief map nor by the detail geometric data.

On account of the precise representation of the three-dimensional object it is now possible to generate a virtual two-dimensional image 33 of the object (step S14). A virtual camera 34 is positioned, relative to the virtual three-dimensional object, at the same point as the real camera 32 in taking the real two-dimensional image 31, and the same field of view is set as for the taking of the real two-dimensional image 31 by the real camera 32. The virtual two-dimensional image 33 thus generated is, with respect to the perspective view of the three-dimensional object in the two-dimensional image, substantially identical to the real two-dimensional image 31.

To explain this method, images of a hut 35, forming the real object, are shown in FIG. 8.

A texture space 36, also described as UV space, is provided. This texture space contains surface elements which correspond to surface sections of the object. In the case of the hut, these are e.g. the roof surfaces and the side surfaces of the hut.

The virtual image generated in step S14 is assigned to the texture space 36 in step S15. Since the texture space has been generated with the aid of the geometric description of the virtual object, there is a clear assignment of the points of the surface of the virtual object to the points in the texture space, which are described as texels. Since the real two-dimensional image 31 has also been generated with the aid of the geometric description of the virtual three-dimensional object, there is also a clear relationship between the image points of the virtual two-dimensional image and the points of the surface of the virtual three-dimensional object, and therefore also a clear relationship between the image points of the virtual two-dimensional image and the texels of the texture space 36. Consequently, an image point 37 of the real two-dimensional image 31 is assigned to the texture space 36 at the texel 38 which corresponds to the image point 39 in the virtual two-dimensional image 33. This means in other words that, in assigning one of the image points 37 of the real two-dimensional image 31 to the texture space 36, firstly the corresponding image point 39 in the virtual two-dimensional image 33 is determined. The corresponding image point 39 is to be found in the virtual two-dimensional image 33 at the same point as the image point 37 in the real two-dimensional image 31. With the aid of the image point 39 of the virtual image 33, the assignment to the corresponding texel 38 in the texture space 36 is certain, so that the image point 37 of the real image 31 may be assigned clearly to the texture space.

In assigning the image point 37 of the real image 31 to the texture space 36, the color values of the image point 37 are assigned to the texel 38 or entered there. This assignment is effected very quickly since, similarly to a look-up table, the image points of the real image may be assigned to the corresponding texel.

In step S16 a check is made as to whether real two-dimensional images are available. If this is the case, then the process sequence passes to step S12 and the further real two-dimensional image is read in. Steps S12 to S15 are then executed in the same manner as explained above. It may be that several real two-dimensional images contain image points 37 which are to be assigned to the same texel in the texture space 36. Here the color values of the different image points are preferably averaged. It may also be expedient, in the course of averaging, to apply the weighting explained above depending on the deviation of the direction of view of the camera from a normal to the surface of the object on which the respective image point 37 or 39 is located. The more the direction of view of the camera deviates from this normal, the less the weight given to the image point concerned in the texture space 36.

It is expedient to generate the texture for an object from several real two-dimensional images, since normally only a portion of the texture space can be covered by an individual real two-dimensional image. As a rule, parts of an object are concealed in a two-dimensional image. This applies especially to rear sides, undercuts and recesses. By taking into account several two-dimensional images from the most diverse directions, a complete texture may be generated.

If the search in step S16 reveals that no further real two-dimensional image for the object exists then, in step S17, the texture generated by steps S12 to S15 is mapped on the object and the 3D relief map respectively. The process is terminated by step S18.

In the process explained above, therefore, the referencing information on position of camera, direction of view and field of view is used to transform the image points of the real two-dimensional images into the texture space.

With the embodiments described above it is possible to generate an underwater map which reproduces very precisely the contour of the bottom and moreover, through the use of texture, has a natural appearance. The invention is not however restricted to the generation of underwater maps. The invention may be used to advantage anywhere where high-precision 3D data of an object is available. The method explained above may be used e.g. in various medical applications. For the modelling of teeth and dental implants, these may be measured e.g. by laser. Two-dimensional color images of the teeth may be taken with a special camera which has e.g. an optical angular element with which the rear of the teeth may also be recorded. From the two-dimensional image data a texture is generated and mapped on the three-dimensional model. In this way, 3D data are obtained which correctly reproduces both the contour of the teeth and also their appearance in color.

LIST OF REFERENCE NUMBERS

1 scanner
2 floating body
3 submersible body
4 water surface
5 towing line
6 cable
7 bandpass filter
8 demodulator
9 A/D converter
10 central control unit
11 D/A converter
12 modulator
13 2D camera
14 bottom
15 direction of view
16 illuminating device
17 memory device
18 3D scanner
19 3D scanner
20 direction of view
21 rudder
22 rudder control device
23 positioning element
24 3D scanner
25 direction of view
26 submersible-body scanner
27 direction of view
28 satellite navigation system
29 satellite
30 bar
31 real two-dimensional image
32 real camera
33 virtual two-dimensional image
34 virtual camera
35 hut
36 texture space
37 image point of the real two-dimensional image
38 texel
39 image point of the virtual two-dimensional image
40 pressure sensor
41 temperature sensor
42 first sensor controller
43 clock 44 hydrophone
45 second sensor controller
46 transmitting device
47 microcontroller
48 interface
49 housing
50 inertial sensor
51 GPS receiver
52 aerial
53 clock
54 transmitter circuit
55 hydro sound source
56 GPS satellite
57 circle
58 level
59 memory device
60 log record
61 image record

The invention claimed is:

1. Method of generating 3D data of an object for the generation of underwater maps with a scanner comprising a camera, referencing device, and 3D scanner and a computer, wherein the following steps are performed:
provision of two-dimensional image data with the camera of a surface of the object, including a bottom of a body of water, together with reference information from the referencing device;
provision of a three-dimensional polygonized relief map of a predetermined area of the object or of the bottom of a body of water using the 3D scanner, and
mapping of the two-dimensional image data as texture on the three-dimensional polygonized relief map by means of the reference information with the computer that generates a relief map in which the individual points have a maximum spacing of 20 centimeters.

2. The method of generating underwater maps according to claim 1, wherein the following steps are performed:
provision of two-dimensional image data of the surface of the object including the bottom of a body of water, together with reference information
provision of a three-dimensional relief map of a predetermined area of the object or of the bottom of a body of water, and
mapping of the two-dimensional image data as texture on the three-dimensional relief map by means of the reference information, wherein the three-dimensional relief map is already provided, by scanning the bottom of the body of water with a 3D scanner mounted on a floating body or submersible body which is so connected to a radio navigation unit that position coordinates determined by the radio navigation unit are assigned as reference information of the three-dimensional relief map.

3. The method according to claim 1
wherein to map the two-dimensional image data as texture on the three-dimensional relief map, the two-dimensional image data are transformed into a texture space by means of the reference information,
the assignment of the points in the texture space to the respective points in the relief map is determined by means of the reference information, and
color values of points of the texture space are mapped on the assigned points in the relief map.

4. The method according to claim 1
wherein several color values of different two-dimensional image data are assigned to one point of the relief map, wherein the several color values are interpolated or averaged.

5. The method according to claim 1
wherein to provide a three-dimensional relief map, an object such as e.g. the bottom of a body of water is scanned from two different directions, and the information obtained in this way is put together to generate the three-dimensional relief map.

6. The method according to claim 5
wherein the two different directions enclose an angle of at least 30° and/or at least 60° and are roughly orthogonal to one another and/or aligned to one another horizontally and vertically.

7. The method according to claim 1
wherein the scanning to generate three-dimensional information is carried out by sonar scanning, or scanning using a stereo camera and/or time-of-flight camera.

8. The method according to claim 1
wherein a relief map is generated in which the individual points have a precision of at least 20 centimeters.

9. The method according to claim 1
wherein the texture is generated from two-dimensional image data which has been created from a real object corresponding to an object represented on the relief map, wherein a virtual image which has been created of the object represented on the relief map, wherein the virtual image is created with the same camera position, the same direction of view and the same field of view as a corresponding real image of the two-dimensional image data,
a texture space of the object represented in the relief map is created, so that an assignment exists in each case between points of the surface of the object represented in the relief map and texels of the texture space, and
the image points of this real image are assigned to the texture space by means of the real image and the assignment hereby determined between the image points of the virtual image, each representing a point on the surface of the object, and their assignment to the texels of the texture space.

10. Method of generating 3D data of an object for the generation of underwater maps with a scanner comprising a camera, referencing device, and a 3D scanner and a computer, wherein the following steps are performed:
provision of two-dimensional image data with the camera of a surface of the object, including a bottom of a body of water, together with reference information from the reference device;
provision of a three-dimensional polygonized relief map of a predetermined area of the object or of the bottom of a body of water using the 3D scanner, and
mapping of the two-dimensional image data as texture on the three-dimensional polygonized relief map by means of the reference information with the computer,
wherein the reference information contains the direction of view used to record the two-dimensional image data and, in mapping the two-dimensional image data as texture on the three-dimensional relief map, the two-dimensional image data are weighted in inverse proportion to the deviation of the direction of view from the normal of the area of the three-dimensional relief map on which the two-dimensional image data are mapped.

11. Method of generating a texture which can be mapped on a three-dimensional relief map with a scanner comprising a camera and a referencing device and a computer, wherein the texture is generated from two-dimensional image data from the camera which has been created from a real object corresponding to an object represented on the relief map, wherein a virtual image which has been created of the object represented on the relief map by the computer, wherein the virtual image is created with the same camera position of the camera, the same direction of view and the same field of view as a corresponding real image of the two-dimensional image data with reference to information from the referencing device, a texture space of the object represented in the relief map is created by the computer, so that an assignment exists in each case between points of the surface of the object represented in the relief map and texels of the texture space, and the image points of this real image are assigned by the computer to the texture space by means of the real image and the assignment hereby determined between the image points of the virtual image, each representing a point on the surface of the object, and their assignment to the texels of the texture space.

12. The method according to claim 11 wherein to provide the two-dimensional image data, the scanner for the scanning of an object, e.g. the bottom of a body of water, is used, with which the two-dimensional image data are generated, wherein the scanner further includes a submersible body with the camera being mounted in the submersible body for the generation of image data describing the bottom, and the referencing device generates referencing information which is assigned to the image data, so that the position of the segment of the bottom shown in the respective image data are defined.

* * * * *